(12) United States Patent
Xu et al.

(10) Patent No.: US 11,630,180 B2
(45) Date of Patent: Apr. 18, 2023

(54) ELECTRONIC POLAR ALIGNMENT FOR ASTRONOMICAL INSTRUMENT

(71) Applicant: Nanjing iOptron Scientific, Inc. Ltd., Jingsu (CN)

(72) Inventors: Chengcheng Xu, Nanjing (CN); Baitao Zhao, Nanjing (CN); Hua Jiang, Sharon, MA (US)

(73) Assignee: Nanjing iOptron Scientific, Inc. Ltd., Jingsu (CN)

( * ) Notice: Subject to any disclaimer, the term of this patent is extended or adjusted under 35 U.S.C. 154(b) by 690 days.

(21) Appl. No.: 16/599,806

(22) Filed: Oct. 11, 2019

(65) Prior Publication Data

US 2020/0233055 A1    Jul. 23, 2020

(30) Foreign Application Priority Data

Jan. 18, 2019   (CN) .......................... 2019100516268

(51) Int. Cl.
| | | |
|---|---|---|
| *G01S 3/786* | (2006.01) | |
| *F16M 11/10* | (2006.01) | |
| *G02B 23/16* | (2006.01) | |
| *G01C 25/00* | (2006.01) | |

(52) U.S. Cl.
CPC ........... *G01S 3/7867* (2013.01); *F16M 11/10* (2013.01); *G01C 25/00* (2013.01); *G02B 23/16* (2013.01); *G02B 23/165* (2013.01)

(58) Field of Classification Search
USPC ....................................................... 382/103
See application file for complete search history.

(56) References Cited

U.S. PATENT DOCUMENTS

| | | | |
|---|---|---|---|
| 4,260,253 A | 4/1981 | Tuthill | |
| 4,436,421 A | 3/1984 | Suzuki | |
| 4,912,853 A | 4/1990 | McDonnell et al. | |
| 7,221,527 B2 * | 5/2007 | Baun ...................... | G02B 23/16 359/399 |
| 7,482,564 B2 * | 1/2009 | Baun ...................... | G02B 23/12 250/203.1 |
| 7,769,475 B2 * | 8/2010 | Fujimoto ............... | G02B 23/00 700/59 |
| 8,619,360 B2 * | 12/2013 | Mao ...................... | G02B 23/165 359/399 |
| 8,749,885 B2 * | 6/2014 | Fujimoto ................. | G01S 5/16 700/59 |
| 9,128,292 B2 | 9/2015 | Xu et al. | |

(Continued)

OTHER PUBLICATIONS

"Celestron Polar Axis Finderscope—CG-4 & CG-5—#94223/94224", Mar. 2008.

(Continued)

*Primary Examiner* — Clayton E. LaBalle
*Assistant Examiner* — Warren K Fenwick
(74) *Attorney, Agent, or Firm* — BainwoodHuang

(57) ABSTRACT

A technique for polar aligning the mount of a telescope or other astronomical instrument includes acquiring star images from an electronic polar scope and determining a location of a celestial pole relative to the star images based on computerized matching of the star images to information in a database. The mount has a right-ascension (RA) axis, and the technique directs an adjustment to the mount so as to align a location of the RA axis with the determined location of the celestial pole.

20 Claims, 9 Drawing Sheets

(56) References Cited

U.S. PATENT DOCUMENTS

| | | | |
|---|---|---|---|
| 10,054,923 B1* | 8/2018 | Mutlaq | G05B 19/0425 |
| 10,371,785 B2 | 8/2019 | Qiu | |
| 2006/0158722 A1* | 7/2006 | Fujimoto | G02B 23/16 |
| | | | 359/399 |
| 2012/0307356 A1 | 12/2012 | Xu et al. | |
| 2012/0320456 A1* | 12/2012 | Fujimoto | G02B 23/00 |
| | | | 359/430 |

OTHER PUBLICATIONS

Polar\PoleMaster\Polar Scope Webcam—DIY Astronomer—Stargazers Lounge.pdf; downloaded Jun. 9, 2021 from https://stargazerslounge.com/topic/139172-polar-scope-webcam/.

Astro-Physics, Inc., Polar Alignment Telescope (PASILL4), Feb. 9, 2006, Astro-Physics, Inc. 11250 Forest Hills Rd., Machesney Park, IL 61115.

Wikipedia, Atmospheric refraction, downloaded Jun. 5, 2011 from http://en.wikipedia.org/wiki/Atmospheric_refraction.

Carsten A. Arnholm, Polar Alignment, downloaded Dec. 6, 2010 from http://amholm.org/astro/polar_alignmenl/index.html.

Kenko Polar Finder Instructions, Rev. Mar. 2-14, 2005, Hutech Corporation and ScienceCenter.Net.

Instruction Manual for SX Polar Axis Scope, Vixen North America, 32 Elkay Dr., Chester, NY 10918, 2004.

* cited by examiner

ELECTRONIC POLAR ALIGNMENT FOR ASTRONOMICAL INSTRUMENT

BACKGROUND

Many equatorially mounted telescopes and other instruments require polar alignment to perform as designed. As is known, polar alignment is a process whereby an equatorial mount is positioned and adjusted so that the mount's right ascension (RA) axis runs parallel to the Earth's axis of rotation. Once polar aligned, an equatorial mount can compensate for the Earth's rotation merely by counter-rotating the mount about the RA axis at a rate of approximately once per day. Many equatorial mounts include clock drives to provide the needed rotation. A clock-driven, polar-aligned, equatorially-mounted telescope can keep a celestial object approximately centered in the telescope's field of view over a long observing session.

The ability to keep an object centered depends largely on the accuracy of polar alignment. The more accurate the alignment, the fewer corrections have to be made over time. Accurate polar alignment is essential for effective go-to operation, as a telescope that is not properly aligned cannot locate objects automatically based on celestial coordinates. It is also essential for good astrophotography, where exposure times can reach multiple hours.

To promote accurate polar alignment, many equatorial mounts include built-in polar scopes, i.e., small telescopes mounted coaxially with the mounts' RA axes. Some polar scopes include illuminated reticles that display star images or other patterns, which the user can see superimposed on actual stars. The user can adjust the mount (e.g., in altitude and azimuth) and rotate the reticle so that the stars as viewed through the polar scope line up with the pattern on the reticle. An example of this type of polar scope and alignment is disclosed in U.S. Patent Publication No. 2012/0307356A1, the contents and teachings of which are incorporated herein by reference in their entirety.

SUMMARY

Unfortunately, prior approaches to polar alignment can pose challenges to users. Not least of these is the need for a user to adjust a mount's altitude and azimuth while simultaneously looking through a polar scope and turning a reticule in the dark. As polar scopes are almost always pointed up (toward the North Celestial Pole in the Northern Hemisphere or toward the South Celestial Pole in the Southern Hemisphere), it can place a strain on the user's neck to have to look up, especially when the polar scope is low to the ground, as it often is. In addition, it can be difficult for many users to achieve good alignment accuracy. Lining up stars with reticle images can take some practice, and errors can arise if the user's eye is not perfectly aligned with the polar scope. Thus, it would be desirable to provide a polar scope and methodology that is easier for users and more consistently accurate.

In contrast with prior approaches, an improved technique for polar aligning the mount of a telescope or other astronomical instrument includes acquiring star images from an electronic polar scope and determining a location of a celestial pole relative to the star images based on computerized matching of the star images to information in a database. The mount has a right-ascension (RA) axis, and the technique directs an adjustment to the mount so as to align a location of the RA axis with the determined location of the celestial pole.

Certain embodiments are directed to a method of polar aligning a mount for an astronomical instrument. The method includes acquiring star images from an electronic scope coupled to or integral with the mount and determining a location of a celestial pole relative to the star images, based on computerized matching of the star images to information in a database. The method further includes displaying, by a computing device operatively connected to the electronic scope, the star images superimposed with a first symbol and a second symbol, the first symbol indicating the determined location of the celestial pole relative to the star images, the second symbol indicating a location at which a right ascension (RA) axis of the mount intersects a field of view of the electronic scope, the mount becoming polar aligned responsive to the first symbol intersecting the second symbol.

Other embodiments are directed to a mount for an astronomical instrument. The mount includes a right-ascension (RA) axis, an electronic scope oriented substantially parallel to the RA axis, and a set of non-transitory, computer-readable media having instructions which, when executed by a computing device, cause the computing device to perform a method of polar aligning the mount, such as the method described above. Still other embodiments are directed to a computer program product. The computer program product stores instructions which, when executed by a computing device, cause the computing device to perform a method of polar aligning the mount, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Embodiments of the improved technique will now be described. One should appreciate that such embodiments are provided by way of example to illustrate certain features and principles but are not intended to be limiting.

An improved technique for polar aligning the mount of a telescope or other astronomical instrument includes acquiring star images from an electronic polar scope and determining a location of a celestial pole relative to the star images based on computerized matching of the star images to information in a database. The mount has a right-ascension (RA) axis, and the technique directs an adjustment to the mount so as to align a location of the RA axis with the determined location of the celestial pole.

Figure 1:
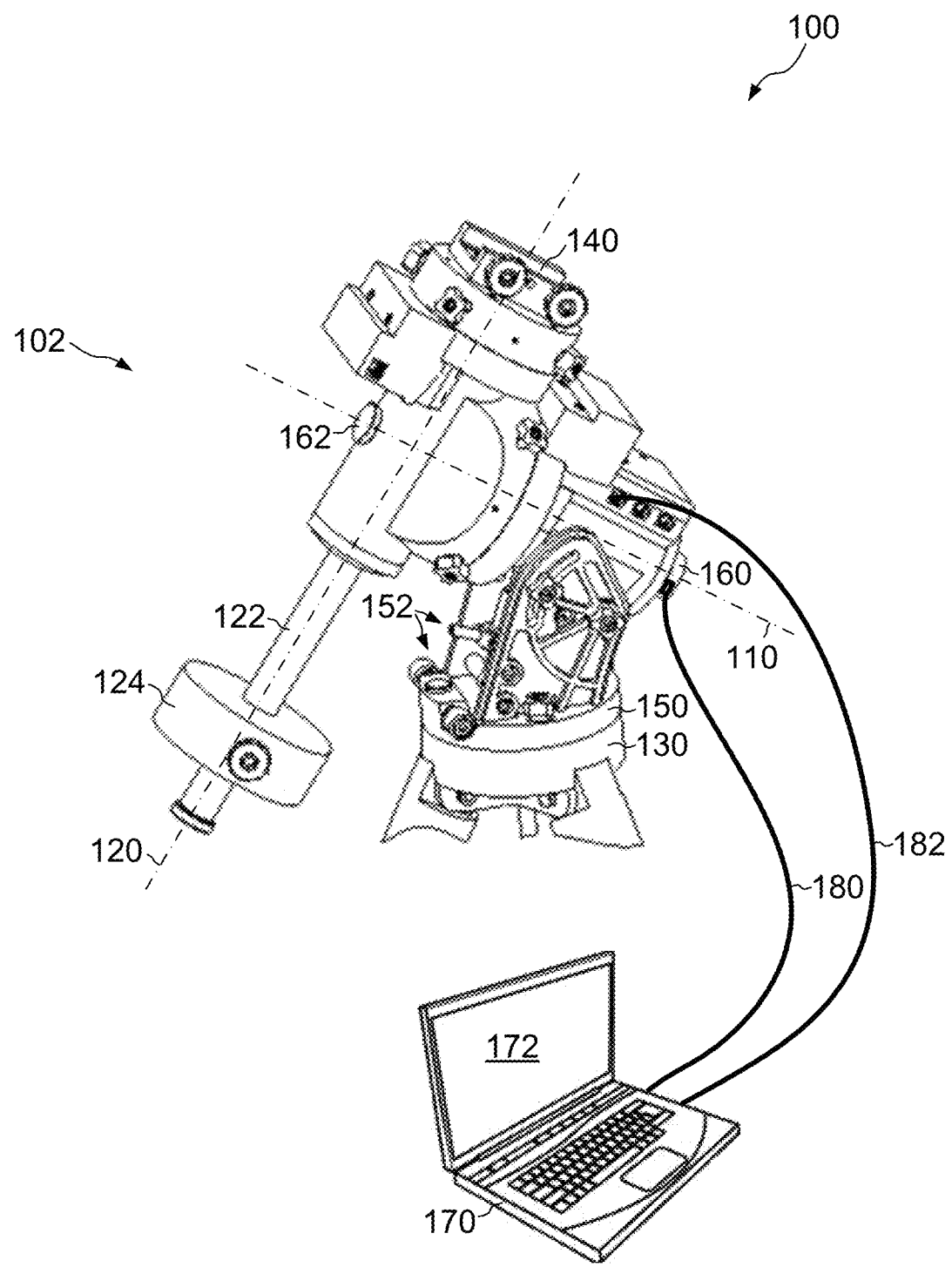
FIG. 1 is a perspective view of an example environment in which embodiments of the improved technique can be practiced.

FIG. 1 shows an example environment 100 in which embodiments of the improved technique can be practiced. The environment 100 includes a mount 102 having an RA axis 110 and a declination axis 120. The mount 102 sits on a stand 130, such as a tripod or pedestal. The mount 102 also has an adapter 140, such as a dovetail clamp, configured to receive an optical assembly (not shown). The optical assembly may be a telescope, a camera, or some other astronomical instrument. A declination shaft 122 extends along the declination axis 120, and a counterweight 124 attaches to the declination shaft 122. The counterweight 124 is configured to be slid to different locations along the declination shaft 122, so as to balance the weight of the optical assembly (and any additional equipment) across the RA axis 110. The mount 102 includes an adjustable wedge 150 having adjustments 152, such as knobs. The adjustments 152 enable the angle of the mount 102 to be varied in both altitude (up and down) and azimuth (left and right).

As further shown in FIG. 1, an example electronic polar scope 160 is attached to or integral with the mount 102 and is oriented substantially parallel to the RA axis 110. In the example shown, the electronic polar scope 160 is permanently installed coaxially with the RA axis 110. The electronic polar scope 160 is configured to receive light from the forward direction of the RA axis 110, to focus the light, and to generate images of objects. In the arrangement shown, the mount 102 includes an aperture 162 for allowing light to pass unobstructed to the electronic polar scope 160. The aperture 162 may be a hole or a transparent cover, for example.

A computing device 170 operatively connects to the electronic polar scope 160, e.g., via a cable 180, for controlling the electronic polar scope 160 and for reading back image data and settings. In some examples, the computing device 170 separately connects to the mount 102 via another cable 182, e.g., for controlling positioning and tracking of the mount 102 and/or for performing other functions. In an example, the mount 102 is a go-to mount, meaning that it includes motors for automatically driving the RA and declination axes to specified coordinates. This is not required, however, as the mount 102 may be any equatorial mount or other mount that can be adapted for equatorial tracking.

The computing device 170 may be any computerized apparatus capable of running software, displaying images, and communicating with the electronic polar scope 160, such as a laptop computer, desktop computer, tablet computer, smart phone, PDA (Personal Data Assistant), or the like. Cables 180 and 182 may be USB (Universal Serial Bus) cables, RS-232 cables, RS-422 cables, Ethernet cables, telephone cables, or the like. There is no need for the cables 180 and 182 to be of the same type. In some examples, the electronic polar scope 160 may employ wireless communication, such as Wi-Fi and/or Bluetooth, and the computing device 170 may connect to the electronic polar scope 160 wirelessly, i.e., without the need for cables 180 and 182.

In example operation, a user places the mount 102 on its stand 130 at a desired site. The user orients the mount 102 in such a way that its RA axis 110 points roughly in the direction of a celestial pole, e.g., to within about 5 degrees of Polaris in the Northern Hemisphere or of Sigma Octantis in the Southern Hemisphere. The user might level the mount 102, which is not required for polar alignment but might be needed for go-to operation. The user plugs in the cable 180 (and optionally the cable 182) and starts a software application on the computing device.

Once running, the software application initializes communication with the electronic polar scope 160. In some examples, the software application at this time directs the user to block a lens of the electronic polar scope 160, e.g., by applying a cap or other cover to the aperture 162. The user covers the aperture 162 and directs the software application to continue. The electronic polar scope 160 then acquires a set of dark frames, i.e., one or more frames that provide output from the polar scope 160 in the absence of incoming light. In an example, the application averages the output for each pixel location over multiple dark frames and thereby produces a respective average reference level for each pixel location. Reference levels typically vary over temperature and from one pixel to the next. The reference levels can later serve as corrections for raw image data, e.g., by subtracting reference levels from respective raw pixel values. In an example, the application also uses dark frames for identifying dead pixels and/or stuck pixels. With the dark frames acquired, the application directs the user to uncover the electronic polar scope 160. The user complies and the electronic polar scope 160 proceeds to acquire star images.

The application displays the star images, preferably corrected for reference levels, on a screen or monitor 172 of the computing device 170. The application also attempts to match the star images to information in a database. The database stores coordinates of stars in a vicinity of the celestial pole (or of both celestial poles), e.g., within about 20 degrees of the pole (or of each pole). In an example, the application performs plate solving and/or other image analysis to identify stars that are detected in the star images. In general, plate solving can be completed by identifying as few as four stars. Based on the image analysis, the application determines a location of the celestial pole relative to the star images. For example, and without being limiting, the application matches stars detected in the star images to stars whose coordinates are stored in the database, computes an angular offset between the matched stars in the database and the celestial pole, transforms that offset into a coordinate system of the electronic polar scope 160, and locates the celestial pole in the displayed images based on the transformed offset. The application then displays a symbol over the star images that indicates the determined location of the celestial pole.

In some examples, the application stores an RA pixel coordinate at which the RA axis 110 intersects the field of view of the electronic polar scope 160. Here, the "field of view" is the displayed area that corresponds to a twodimensional pixel array located at the focal plane of the electronic polar scope 160. Small errors inherent in the electronic polar scope 160 and/or in the mount 102 may cause the RA pixel coordinate to vary from a perfect center of the field of view. One should appreciate, however, that the RA pixel coordinate is a stable characteristic of the system and does not change as long as the mechanical configuration remains constant. In an example, the RA pixel coordinate is factory-determined and encoded within the software application itself. Alternatively, the RA pixel coordinate may be stored in the electronic polar scope 160 and/or may be provided in a separate paper, email, or the like. For example, the user may obtain the RA pixel coordinate in an email from a manufacturer or distributer and manually transfer the coordinate to the application, which then persistently stores the coordinate as part of the application.

When displaying the symbol that indicates the celestial pole, the application may also display a symbol that indicates the RA pixel coordinate. This may be accomplished easily as the RA pixel coordinate is merely a fixed location in the pixel array. The application then directs the user to adjust the mount (e.g., via adjustments 152 for altitude and azimuth) to bring the two symbols into alignment with each other. When the user has successfully aligned the two symbols, the mount 102 has become accurately polar aligned.

In the manner described, accurate polar alignment can be achieved easily, without stressing the user's skills or straining the user's neck. The user can complete the alignment while standing or sitting in a comfortable position. There is no need to rotate any reticle or to visually line up any features other than the two symbols, which can be rendered onscreen for easy visualization.

Figure 2:
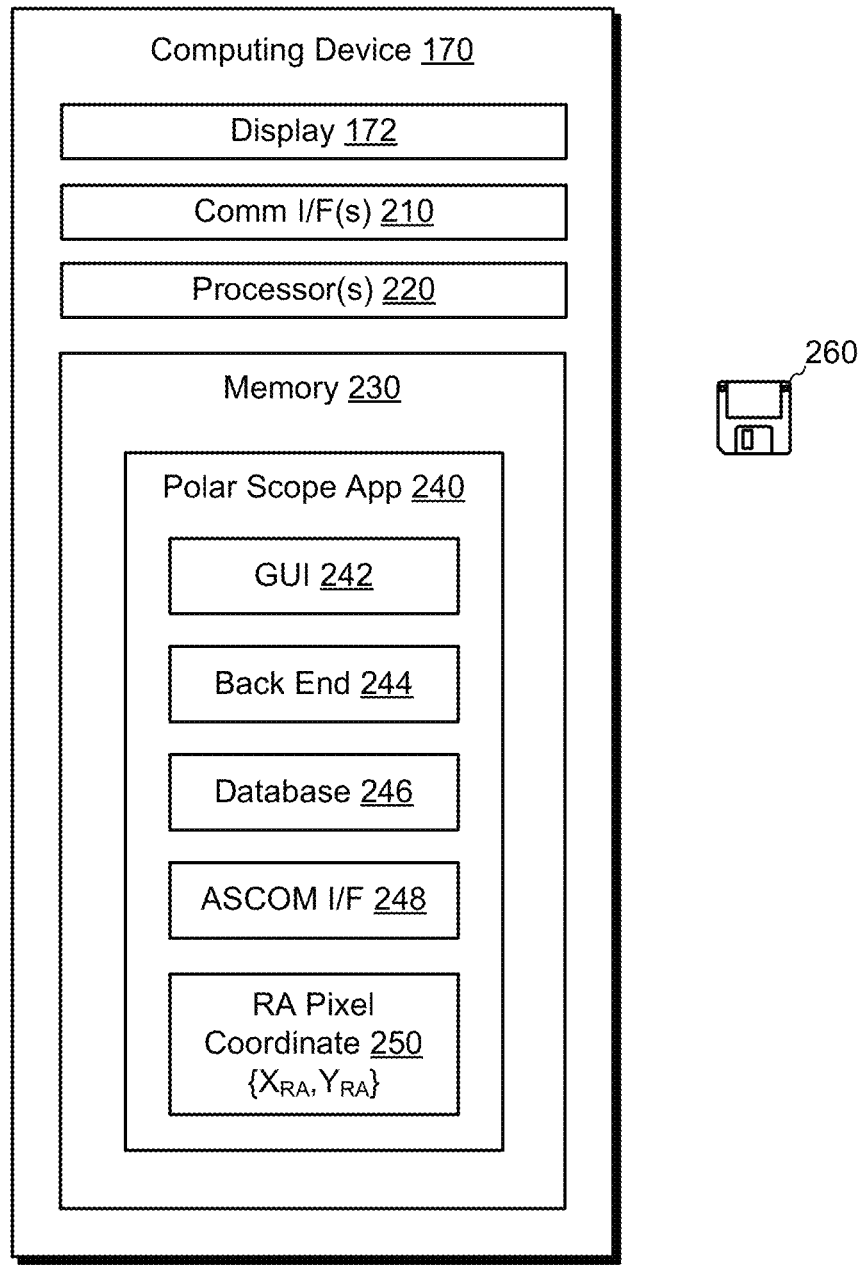
FIG. 2 is a block diagram of an example computing device of FIG. 1.

FIG. 2 shows the example computing device 170 in additional detail. As shown, the computing device 170 includes the display 172, one or more communication interfaces 210, a set of processors 220, and memory 230. The display 172 may be a computer monitor, screen, television, touch screen or the like. The communication interface(s) 210 include, for example, one or more USB interfaces, RS-232 interfaces, RS-422 interfaces, Ethernet interfaces, Wi-Fi interfaces, Bluetooth interfaces, and/or the like. The processor(s) 220 may include one or more processing chips and/or assemblies. The memory 230 includes both volatile memory, e.g., RAM (Random Access Memory), and non-volatile memory, such as one or more ROMs (Read-Only Memories), disk drives, solid state drives, and the like. The processor(s) 220 and the memory 230 together form control circuitry, which is constructed and arranged to carry out various methods and functions as described herein. Also, the memory 230 includes a variety of software constructs realized in the form of executable instructions. When the executable instructions are run by the processor(s) 220, the processor(s) 220 carry out the operations of the software constructs. Although certain software constructs are specifically shown and described, it is understood that the memory 230 typically includes many other software components, which are not shown, such as an operating system, various applications, processes, and daemons.

The software constructs in the memory 230, or portions thereof, may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 260). Any number of computer-readable media may be used. The media may be encoded with instructions which, when executed on one or more computers or other processors, perform the process or processes described herein. Such media may be considered articles of manufacture or machines, and may be transportable from one machine to another.

As further shown in FIG. 2, the memory 230 "includes," i.e., realizes by execution of software instructions, an example polar scope application 240, which corresponds to the application described above. The application 240 includes a graphical user interface (GUI) 242, back-end code 244, the above-described database (246), and an optional ASCOM (Astronomy Common Object Model) interface 248. The application 240 may also include the above-described RA pixel coordinate (250), which may be associated with a particular mount 102. In an example, the RA pixel coordinate 250 is an X-Y coordinate pair, i.e., $\{X_{RA}, Y_{RA}\}$, which corresponds to the location of a particular pixel in the pixel array of the electronic polar scope 160.

The GUI 242 is configured to interface with users and to display images, symbols, and various data. The back end 244 is configured to orchestrate user activities and to perform image processing, such as noise reduction, dark frame correction, plate solving, and the like. The database 246 stores coordinates of stars in the vicinity of the celestial poles. It also stores coordinates of the celestial pole (or poles) relative to those star coordinates. The ASCOM interface 248 is an optional component, which enables communication with optional ASCOM software and/or hardware.

Figure 3A:
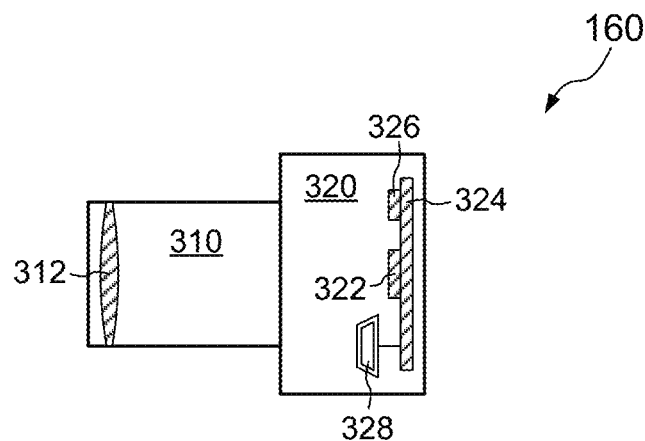
FIGS. 3A-3C are various front plan views (FIGS. 3A and 3B) of an example electronic polar scope of FIG. 1 and a view (FIG. 3C) of an example display of the computing device showing a right-ascension (RA) center of the mount.
Figure 3B:
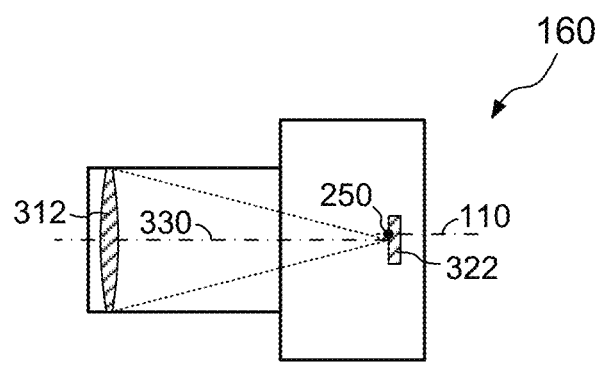

FIGS. 3A and 3B show various views of the electronic polar scope 160. As shown in FIG. 3A, the polar scope 160 includes a barrel 310 coupled to or integral with a focal housing 320. A lens 312 is disposed near a far end of the barrel 310. Although the lens 312 is shown as a simple double-convex lens, other lens types may be used, and multiple lenses may be provided. The focal housing 320 includes an image sensor 322 mounted to a substrate 324, such as a printed circuit board. The image sensor 322 may be a semiconductor charge-coupled device (CCD) or an active pixel sensor, such as one that uses complementary metal-oxide-semiconductor (CMOS) or N-type metal-oxide-semiconductor (NNMOS, Live MOS) technologies. The image sensor 322 is not limited to any particular technology, however. The image sensor 322 may be sensitive to any wavelength range in which stars typically emit light, and such light need not be visible to the human eye.

The substrate 324 may further have mounted thereon a memory device 326, such as a ROM, as well as other components, which are omitted for simplicity. The lens 312, image sensor 322, and associated electronics together form a camera. In an example, the memory device 326 stores device-driver software for enabling the computing device 170 to communicate with the camera. For instance, the computing device 170 is configured to install the device driver software the first time the electronic polar scope 160 is connected to the computing device 170, e.g., in a plug-and-play (PnP) manner.

In a particular example, the camera has a field of view of 13 degrees and an angular resolution of 30 arc-seconds. The focal housing 320 has an external connector 328, such as a mini-USB or other connector, for connecting to the cable 180 (FIG. 1). In an example, the connector 328 is internally wired to the substrate 324 or a component thereof.

As shown in FIG. 3B, the image sensor 322 is placed at a focal plane of the lens 312, i.e., light from distant objects comes to a focus at the lens-facing surface of the image sensor 322. The electronic polar scope 160 has a central axis 330. Owing to misalignments within the electronic polar scope 160 and/or the mount 102, the center line 330 typically does not intersect perfectly with the RA axis 110 of the mount 102. As a result, the center pixel of the image sensor 322 is typically misaligned with the center of rotation of the RA axis 110. Thus, if the mount 102 were rotated in RA only, the imaged stars would appear to follow arcs that are not centered on the center pixel. Rather, such arcs would be centered on the RA pixel coordinate 250, which corresponds to a particular pixel in the image sensor 322.

Figure 3C:
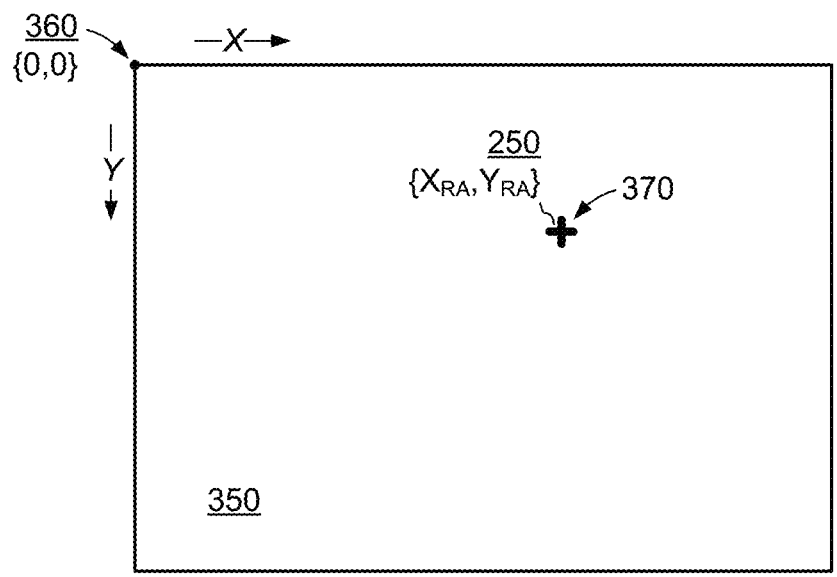

FIG. 3C shows an example screen shot 350 as rendered on the display 172 by the application 240. Here, the application 240 displays the entire field of view of the electronic polar scope 160, e.g., with each pixel of the image sensor 322 rendered in a corresponding location on the display 172. The pixel at coordinate $\{X_{RA}, Y_{RA}\}$ is the RA pixel coordinate 250, which may be referenced to an X-Y origin 360 of the image sensor 322. As the mount 102 is rotated in RA, any displayed stars appear to follow arcs that are centered on the RA pixel coordinate 250. The application 240 identifies the RA pixel coordinate using an easily visualized symbol 370b (e.g., a cross).

Figure 4A:
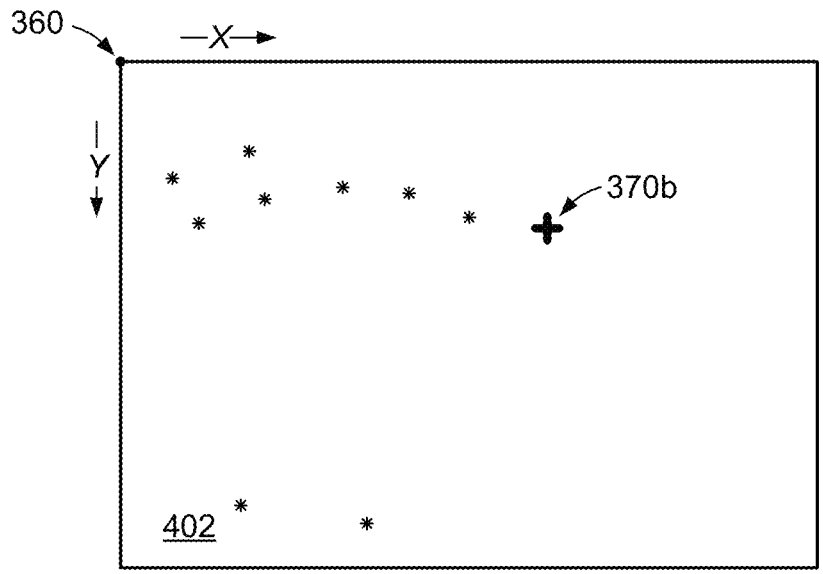
FIGS. 4A and 4B are example views of the display of the computing device showing star images and a determined location of a celestial pole.
Figure 4B:
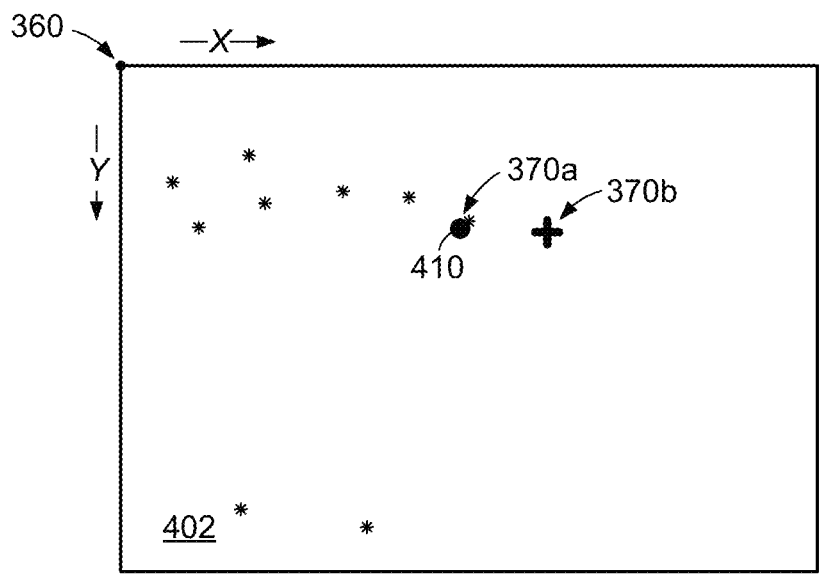

FIGS. 4A and 4B show example star images 402 as acquired by the electronic polar scope 160 and rendered by the application 240 on the display 172. The star images 402 as shown display portions of the constellation Ursa Minor, i.e., the Little Dipper. By performing plate solving or other image processing on frames of the star images 402, the application 240 determines a location 410, relative to the star images, of the North Celestial Pole, As shown in FIG. 4B, the application 240 displays a symbol 370a, such as a round dot, at the determined location 410. To achieve accurate polar alignment, the user may adjust the mount 102 (via adjustments 152) to line up the symbol 370a with the symbol 370b. As symbols 370a and 370b come to within a threshold angular distance of each other, the application 240 may switch automatically to a higher magnification (zoomed-in) view.

Figure 5A:
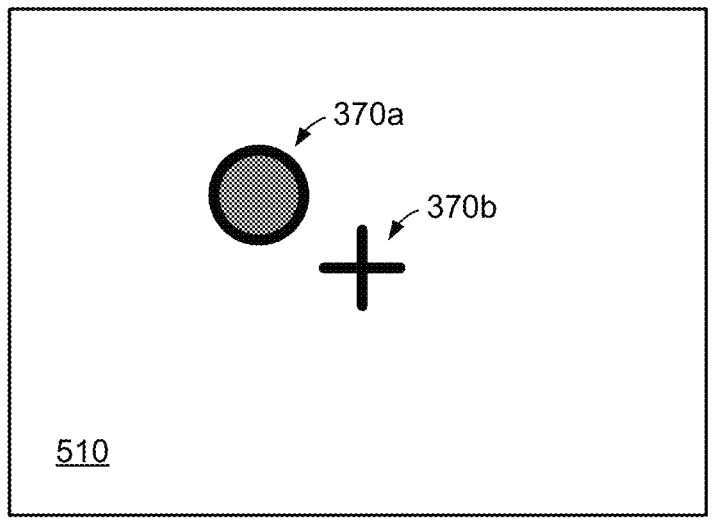
FIGS. 5A and 5B are example zoomed-in views of the display of the computing device.
Figure 5B:
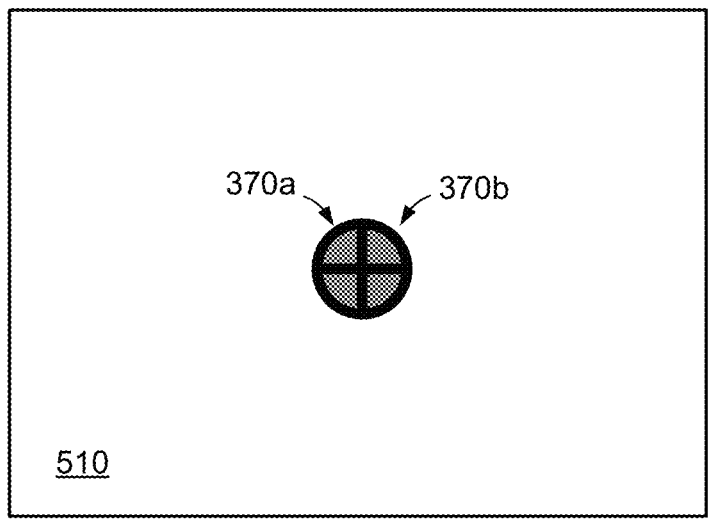

FIGS. 5A and 5B show example images 510 of the zoomed-in view. In FIG. 5A, the two symbols 370a and 370b are close to being aligned and no stars are visible. In FIG. 5B, the symbols are perfectly aligned, or nearly so. At this point, the mount 102 is accurately polar aligned, as the celestial pole intersects with the RA axis 110. The mount 102 can thereafter achieve accurate compensation for the Earth's rotation, tracking celestial objects with minimal correction and supporting long-exposure astrophotography.

Figure 6:
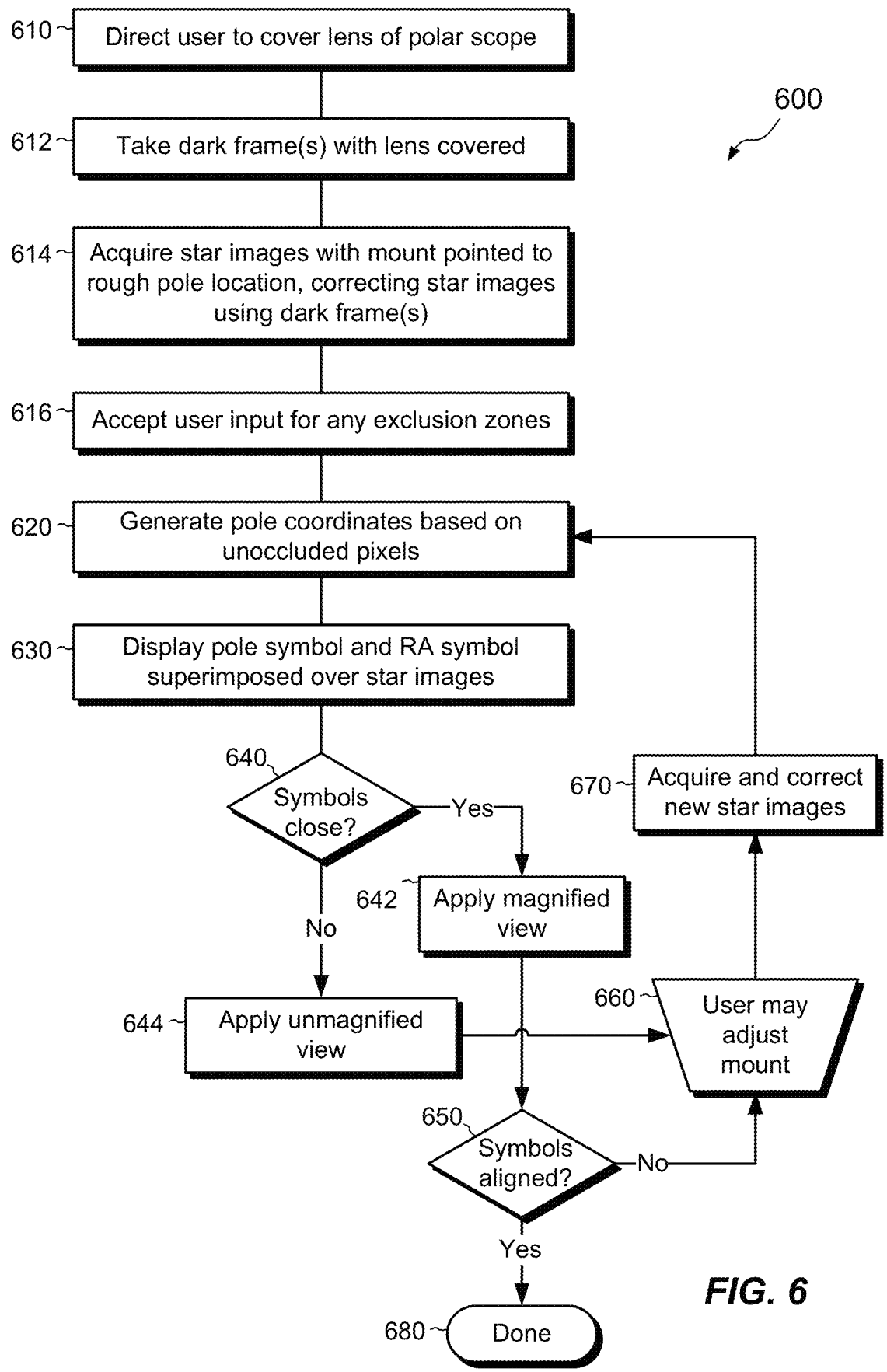
FIG. 6 is a flowchart of an example method of polar-aligning a mount of a telescope or other astronomical instrument.

FIG. 6 shows an example method 600 that may be carried out in connection with the environment 100. The method 600 is typically performed, for example, by the software constructs described in connection with FIG. 2, which reside in the memory 230 of the computing device 170 and are run by the processor(s) 220. The various acts of method 600 may be ordered in any suitable way. Accordingly, embodiments may be constructed in which acts are performed in orders different from that illustrated, which may include performing some acts simultaneously.

At 610, the application 240 directs the user to cover the lens 312 of the electronic polar scope 160, e.g., by placing a cap over the aperture 162 or by otherwise covering the lens 312.

At 612, the application 140 directs the electronic polar scope 160 to take a set of dark frames with the lens 312 covered. In an example, the electronic polar scope 160 acquires multiple dark frames and performs averaging over the dark frames for each pixel individually, thus producing an average dark value for each pixel in the image sensor 322. The application 240 may save the pixel averages in memory 130 for later use. The application 240 may also analyze the dark frames for dead or stuck pixels, i.e., pixels that produce zero output or output that does not change from one frame to the next. The application 240 may store the dead and/or stuck pixel locations in a data structure for later reference.

At 614, the application 240 acquires star images 402 with the mount 102 pointed roughly in the direction of the celestial pole. In some examples, the application 240 corrects the star images 402 based on the dark frames, e.g., by subtracting, pixel-for-pixel, the average dark value of each pixel from the corresponding pixel value in the star images 402. The application 240 may render the star images 402 on the display 172.

At 616, the application 240 may accept input from the user that specifies exclusion zones in the imaged field of view. Exclusion zones are displayed areas that the user wishes to exclude from plate solving or other image processing. In an example, the user defines any desired exclusion regions by operating the GUI 242, e.g., by using a mouse or other pointer to draw the exclusion region as a rectangle or other shape on the display 172. The exclusion zones may include occluded areas of the sky, which are blocked by buildings, trees, or the like. They may also include objects that produce light or reflect ambient light, such as shimmering leaves on trees. The user may wish to exclude these regions to prevent plate solving from misinterpreting occluded areas as absent stars, or from misinterpreting produced light or shimmering objects as present stars.

At 620, the application 240 generates a set of coordinates of the celestial pole (north or south) from the acquired star images, e.g., by using plate solving or other image processing to identify at least four stars in the field of view and calculating the location 410 of the celestial pole relative to the identified stars. In performing the plate solving or other image processing, the application 240 ignores any user-defined exclusion regions, thus avoiding errors associated with missing or false star images. The application 240 may also ignore any dead or stuck pixels.

At 630, the application 240 displays the symbol 370a of the determined celestial pole 410 (FIG. 4B). The application 240 also displays the symbol 370b of the RA pixel coordinate 250. The symbols 370a and 370b are preferably superimposed over the star images 402, so that the user may see both the stars and the symbols together. Displaying images of the stars is not strictly required, however, as the user merely needs to see the symbols 370a and 370b to perform polar alignment.

At 640, the application 240 tests whether the symbols are close together, e.g., whether they are within a threshold angular distance of each other. If not, operation proceeds to 644, whereupon the application 240 continues to apply a normal, un-zoomed view. At 660, the user is allowed to adjust the mount 102 (e.g., via adjustments 152). At 670, the application 240 acquires new star images 402 and corrects them for dark values. Operation then returns to 620, whereupon an updated pole location 410 is determined and the symbols 370a and 370b are displayed over the newly acquired star images 402. Operation may continue in this loop 620, 630, 640, 644, 660, and 670 indefinitely.

If, upon any iteration of the loop, however, the test 640 determines that the symbols 370a and 370b are separated by less than the threshold angular distance, then operation proceeds to 642, whereupon the application 240 applies a magnified (zoomed-in) view of the symbols 370a and 370b.

At 650, the application 240 (or the user) tests whether the symbols 370a and 370b are aligned. For example, the application 240 may determine that the pixel locations of the symbols 370a and 370b are the same, or are within some predetermined error band, and may provide an indication that polar alignment is complete, e.g., by displaying "SUCCESS!," by sounding a tone, or by providing some other alert,. Alternatively, the user may simply decide, based on the apparent perfect or near-perfect alignment of the symbols, that polar alignment is complete, and at 680 the method 600 ends.

If, however, the symbols 370a and 370b are not aligned at 650, then operation proceeds instead to 660, whereupon the user is allowed to adjust the mount 102, and then to 670, whereupon new star images 402 are acquired and corrected. Operation then returns to 620, where updated coordinates 410 of the celestial pole are determined and the symbols 370a and 370b are displayed over the new star images. This loop 620, 630, 640, 642, 650, 660, and 670 may proceed indefinitely, until the user aligns the symbols at 650 or decides that the imperfect alignment is good enough. Then, operation ends at 680.

If, after the application 240 has switched to the zoomed view, the user moves the mount 102 too far or in a wrong direction, such that the symbols 370a and 370b are no longer separated by less than the threshold angular distance, then the application 240 may switch back to the normal (un-zoomed) view. The application 240 may thus switch back and forth between zoomed and un-zoomed views based on the user's adjustments. In an example, decision 640 is made on a per-frame basis, such that the application 240 may provide zoomed or un-zoomed views based on each frame. Other examples provide averaging or hysteresis, so that the views do not chatter back and forth near the threshold. When using hysteresis, the application 240 may apply a smaller threshold when switching from un-zoomed to zoomed display than when switching from zoomed to un-zoomed display.

Figure 7A:
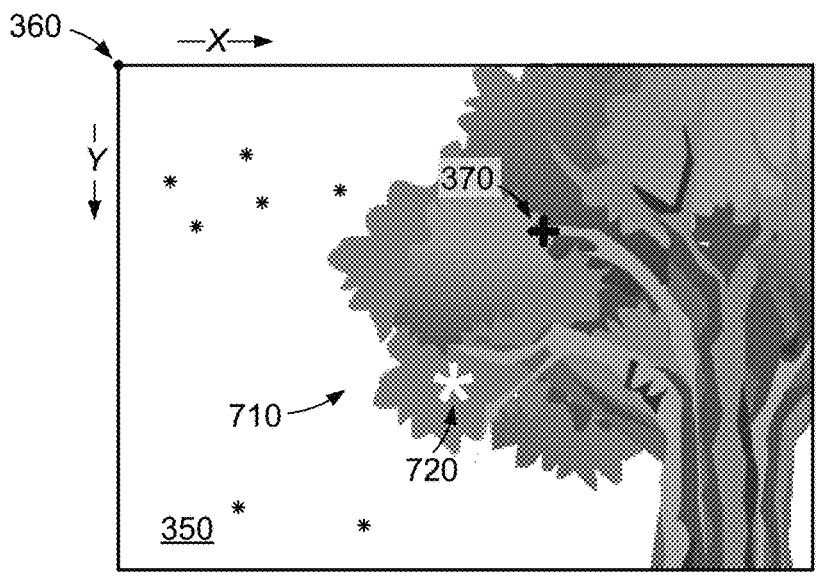
FIGS. 7A-7C show an example arrangement for selectively masking off portions of the display of the computing device such that the masked-off portions are excluded when determining the location of the celestial pole.
Figure 7B:
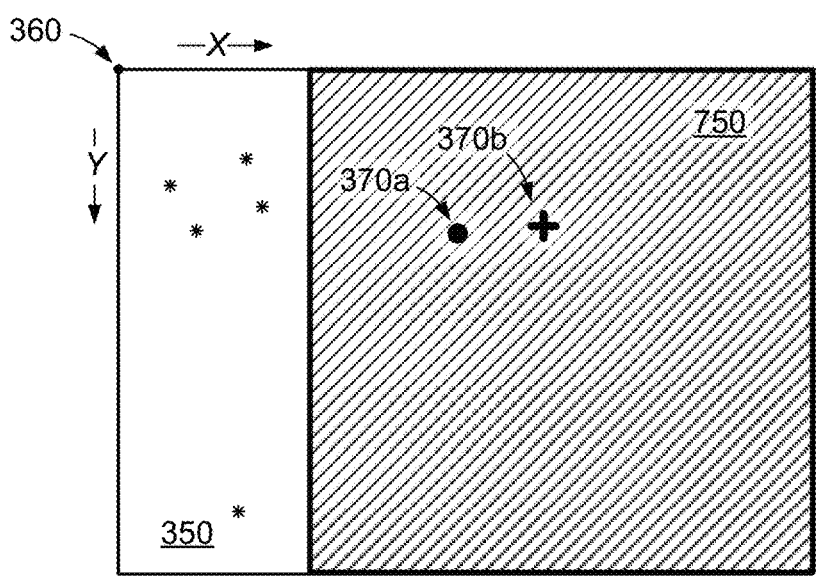
Figure 7C:
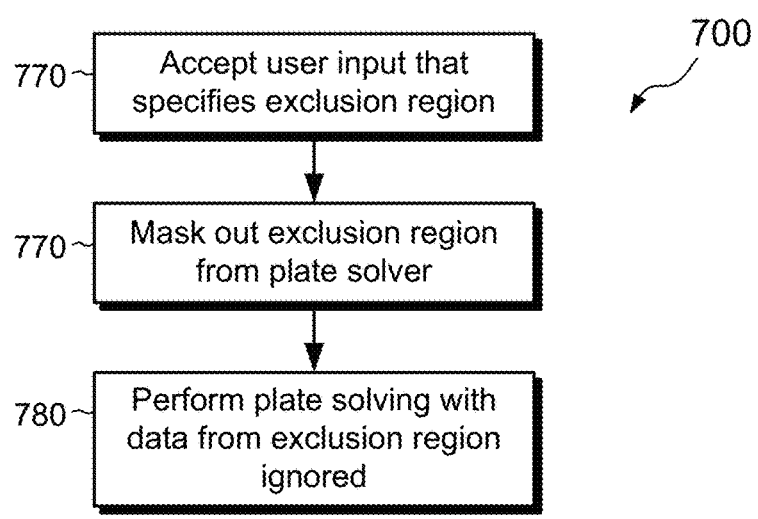

FIGS. 7A-7C show an example arrangement for defining and applying exclusion regions, such as those described in connection with acts 616 and 620 of FIG. 6. FIG. 7A shows an example un-zoomed view through the electronic polar scope 160, e.g., as viewed on the display 172. It can be seen that a tree 710 is blocking part of the field of view. Also, a leaf on the tree 710 is reflecting ambient light to produce a false star image 720. It is also noted that the celestial pole is behind the tree 710 and cannot be directly seen, although its location is within the field of view of the electronic polar scope 160.

As shown in FIG. 7B, the user can operate the GUI 242 to draw a shape, such as a rectangle, over the displayed field of view to define a desired exclusion region 750. Here, the exclusion region 750 covers the entire tree 710, including the false star image 720, and also covers the celestial pole location. Plate solving or other image processing can still proceed, however, as at least four stars are clearly imaged. The coordinates 410 of the celestial pole can thus be located, the symbols 370a and 370b can both be displayed, and polar alignment may proceed as described in connection with FIG. 6.

As shown in FIG. 7C, a method 700 is provided for defining and applying exclusion regions. At 770, the application 240 accepts user input that specifies one or more exclusion regions 750. The exclusion region(s) 750 may be defined as one or more shapes, such as rectangles. The shapes need not be contiguous.

At 780, the application 240 masks out the exclusion region(s) from plate solving or other image processing, e.g., by specifying that the pixels in the exclusion region(s) 750 are don't-care pixels which should be ignored when identifying stars.

At 790, the application 240 performs the plate solving or other image processing, ignoring the don't-care pixels and working only with the stars found in the non-excluded regions. The pole location 410 is determined, and the symbol 370a is displayed.

Figure 8A:
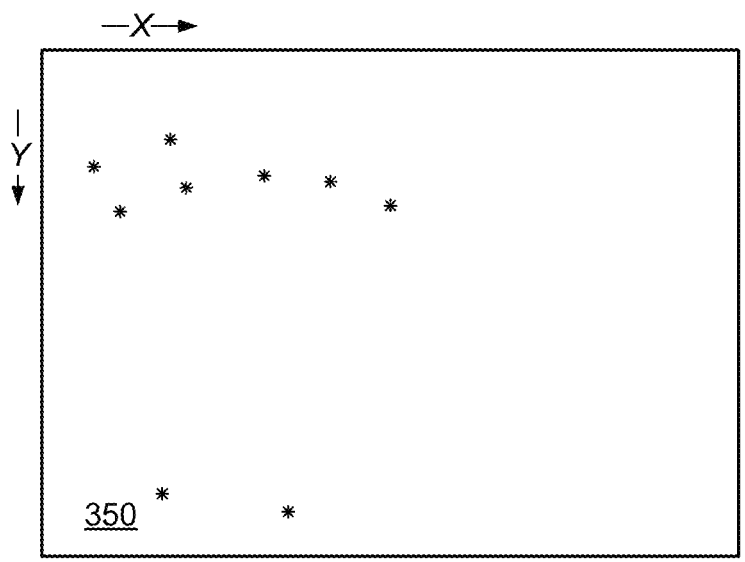
FIGS. 8A-8C are example displays of the computing device when locating an RA center of the mount.
Figure 8B:
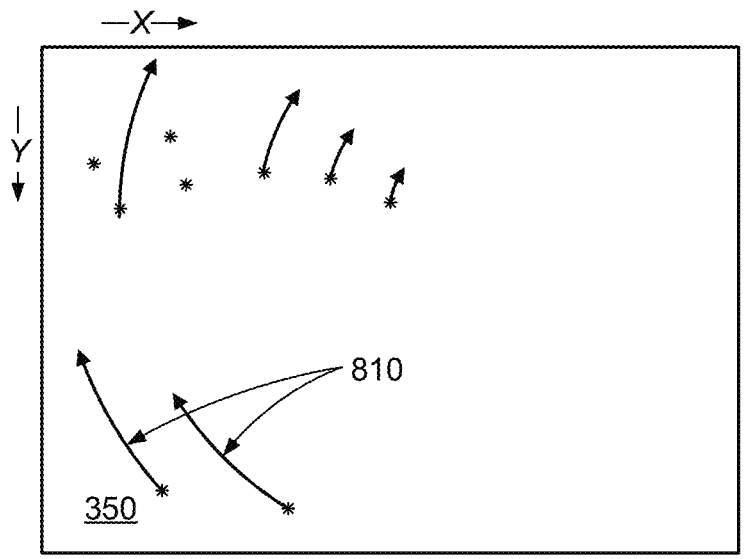
Figure 8C:
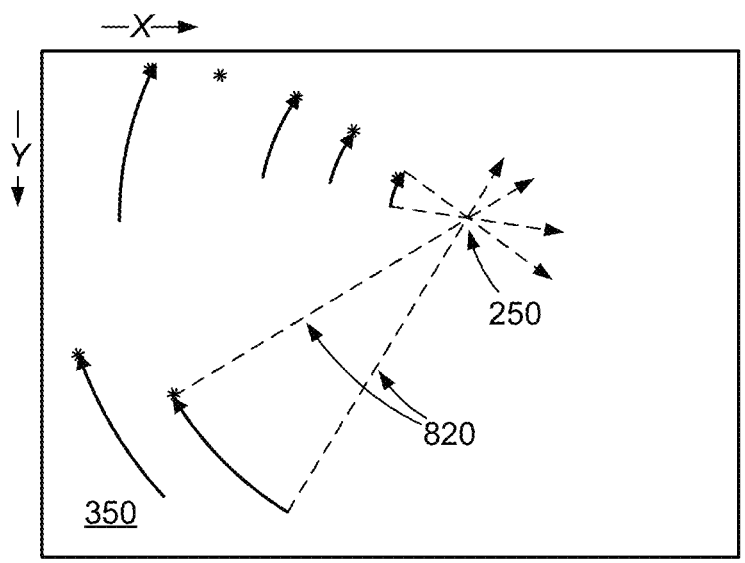

FIGS. 8A-8C show an example arrangement for locating the RA pixel coordinate 250. Location of the RA pixel 250 may be desired in the event that the manufacture provides no RA pixel coordinate 250 or when a provided location becomes invalid, e.g., following repairs or replacement of the mount 102 and/or the electronic polar scope 160.

The depicted arrangement of FIGS. 8A-8C builds upon a well-known, prior-art approach whereby the RA center of a polar scope for a telescope mount is inferred as the center of rotation of stars or other objects as viewed through the polar scope when the telescope mount is rotated about its RA axis. An alignment approach of this type is described, for example, by Celestron® of Torrance, Calif., at pp. 1-2 of a user manual for the Polar Axis Finderscope-CG-4 & CG-5 -#94223/94224. The contents and teachings of this manual are incorporated herein by reference in their entirety. As described in the manual, a user can locate the RA center of a polar scope by rotating the telescope mount in right-ascension and observing that the star or object being viewed describes a semi-circular path centered on the RA axis. The user is directed to adjust the angle of the polar scope using adjustment screws until the star or other object remains stationary in response to rotation of the mount in right ascension.

The arrangement of FIGS. 8A-8C operates on the same principle, except that no physical adjustments are needed. Rather, the user points the RA axis 110 of the mount 102 toward a star or other object, such as a street lamp (FIG. 8A). The user rotates the mount 102 about the RA axis 110. As the mount 102 rotates, the stars or other objects visible in the field of view of the electronic polar scope 160 describe arcs 810. As shown in FIG. 8C, each of the arcs 810 describes a sector of a circle whose center corresponds to the RA axis 110. In particular, each arc 810 describes a respective set of radii 820, and the intersection of the radii 820 marks the spot where the RA pixel coordinate 250 should be placed. Just as the Celestron® approach asks the user to infer a center of the described semicircles, so too can the approach of FIGS. 8A-8C ask the user to infer a similar center of the arcs 810. For example, the application 240 displays the radii 820, or some subset of them, and the user selects the intersection point by clicking the point where the radii come together on the screen 172. In some examples, the application 240 shows a magnified view of the area of intersection, allowing the user to accurately determine and place the RA pixel coordinate 250. In some examples, the user can rotate the mount 102 in RA while the application 240 displays a magnified view of the intersection point, and the user may refine the determination of the RA pixel coordinate 250 until the intersection point remains stationary under rotation. Of course, the arrangement of FIGS. 8A-8C may be automated, as well, with the application 240 automatically calculating the intersection point and assigning that point to the RA pixel coordinate 250.

In some examples, determination of the RA pixel coordinate 250 involves rotating the electronic polar scope 160 in its housing, rather than rotating the mount 102 about its RA axis 110. Rotation of the electronic polar scope 160 in its housing may be the preferred method, particularly in cases where the housing is accurately aligned with the RA axis 110 by design, such that the only significant errors causing the RA pixel coordinate 250 to be off-center arise within the electronic polar scope 160 itself. To use this approach, the user points the RA axis 110 toward a star or other object and rotates the electronic polar scope 160 in its housing. Such rotation causes the star or other object to describe arcs 810, from which the RA pixel coordinate 250 may be determined as the point of intersection of the radii 820. One should appreciate that the described approach for locating the RA pixel coordinate 250 does not require the RA axis 110 to be pointed in the direction of a pole. Rather, the RA axis 110 may be pointed to any star or other stationary object.

Determination of the RA pixel coordinate 250 using this approach may be automatic, semi-automatic, or manual. According to a fully automatic approach, the mount 102 includes a motor (not shown) for rotating the electronic polar scope 160 in its housing. In response to a simple user command, the application 240 may direct the motor to rotate the electronic polar scope 160 as the electronic polar scope 160 acquires images, from which the application 240 automatically calculates the RA pixel coordinate 250.

Figures 9A, 9B:
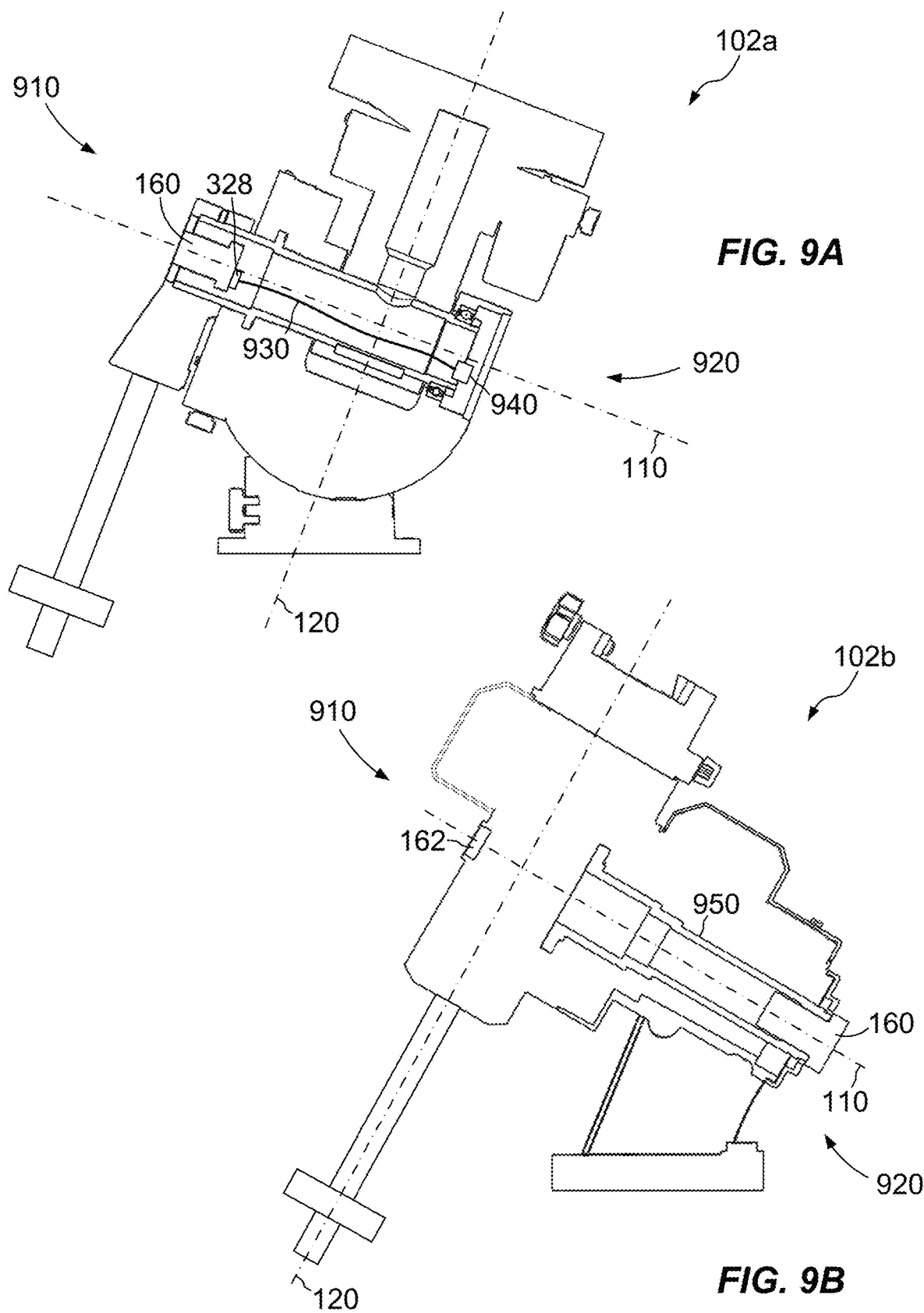
FIGS. 9A and 9B are side views that show various physical placements of the electronic polar scope in a mount

FIGS. 9A and 9B show various mechanical arrangements for mounting the electronic polar scope 160. As shown in FIG. 9A, the electronic polar scope 160 is mounted to a sky-facing side 910 of a mount 102a, such that the lens 312 of the electronic polar scope 160 faces out. The arrangement of FIG. 9A may be useful in mounts that are not light-tight or do not provide an unobstructed view along the RA axis 110. In this arrangement, the connector 328 (FIG. 3) may be mounted to the back of the electronic polar scope 160 (rather than to its side, as shown in FIG. 3A) and an internal cable 930 may extend to another connector 940 on a ground-facing side 920 of the mount 102a. The cable 180 may then connect to the connector 940.

As shown in FIG. 9B, the electronic polar scope 160 is mounted to a ground-facing side 920 of a mount 102b, such that the lens 312 of the electronic polar scope 160 faces in—toward the aperture 162. The arrangement of FIG. 9B is thus similar to the one shown in FIG. 1. The electronic polar scope 160 may be placed in a housing 950. In some examples, the housing 950 also serves as a light baffle, preventing stray light that enters the mount 102b from reaching the lens 312.

An improved technique has been described for performing polar alignment of a mount 102 of a telescope or other astronomical instrument. The technique includes acquiring star images 402 from an electronic polar scope 160 and determining a location 410 of a celestial pole relative to the star images 402 based on computerized matching of the star images 402 to information in a database 246. The mount 102 has a right-ascension (RA) axis 110, and the technique directs an adjustment to the mount 102 so as to align the determined location 410 of the celestial pole with a location of the RA axis 110.

Having described certain embodiments, numerous alternative embodiments or variations can be made. For example, although embodiments have been shown and described in connection with fully-functional equatorial mounts 102, 102a, and 102b, embodiments may also be provided that use other types of mounts adapted for equatorial tracking. For example, embodiments may be used with an altazimuth mount equipped with an equatorial wedge, or with a star tracking mount, such as the SkyTracker and SkyTracker Pro camera mounts, available from iOptron Corporation of Woburn, Mass. Such star tracking mounts may include holes or housings for receiving the electronic polar scope 160. The electronic polar scope 160 may be rotated easily within the holes or housings to locate the RA pixel coordinate 250, if necessary, and polar alignment can proceed in the manner described above.

Further, embodiments have been described in which adjustments 152 of the mount 102 are provided in the form of manual knobs. In other embodiments, however, the functions of the knobs may be replaced with motors. The motors may operate under control of the application 240, which may automatically vary the adjustments 152 to polar align the mount 102 with little or no user interaction.

Further, although features have been shown and described with reference to particular embodiments hereof, such features may be included and hereby are included in any of the disclosed embodiments and their variants. Thus, it is understood that features disclosed in connection with any embodiment are included in any other embodiment.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, the terms "based on" and "based upon" should be interpreted as meaning "based at least in part on" or "based at least in part upon," as bases need not be exclusive unless explicitly stated. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of polar aligning a mount for an astronomical instrument, the method comprising:
   acquiring star images from an electronic scope coupled to or integral with the mount;
   determining a location of a celestial pole relative to the star images, based on computerized matching of the star images to information in a database;
   displaying, by a computing device operatively connected to the electronic scope, the star images superimposed with a first symbol and a second symbol, the first symbol indicating the determined location of the celestial pole relative to the star images, the second symbol indicating a location at which a right ascension (RA) axis of the mount intersects a field of view of the electronic scope, the mount becoming polar aligned responsive to the first symbol intersecting the second symbol.

2. The method of claim 1, further comprising:
acquiring a set of dark images from the electronic scope with a lens of the electronic scope covered; and
correcting the star images using the set of dark images.

3. The method of claim 1, wherein the electronic scope includes firmware that stores camera driver software that enables the computing device to operate the electronic scope.

4. The method of claim 1, wherein the computing device runs an application that stores an RA coordinate that provides the location at which the RA axis of the mount intersects the field of view of the electronic scope.

5. The method of claim 4, wherein the application stores the RA coordinate in a non-volatile storage medium.

6. The method of claim 4, further comprising determining the RA coordinate by:
acquiring images from the electronic scope as the electronic scope is rotated relative to the mount; and
identifying the RA coordinate as a center of rotation of a set of objects displayed in the acquired images.

7. The method of claim 1, wherein the star images show a foreground object, and wherein the method further comprises:
receiving user input that identifies an exclusion region that contains at least part of the foreground object,
wherein determining the location of the celestial pole relative to the star images ignores any content in the exclusion region identified by the user input.

8. The method of claim 7, wherein the foreground object occludes the celestial pole, and wherein determining the location of the celestial pole relative to the star images does not require the celestial pole to be visible in the star images.

9. The method of claim 1, wherein displaying the star images superimposed with the first symbol and the second symbol includes switching from a lower magnification view to a higher magnification view responsive to the first symbol and the second symbol coming within a threshold distance of each other in the star images.

10. The method of claim 9, wherein displaying the star images superimposed with the first symbol and the second symbol includes switching from the higher magnification view to the lower magnification view responsive to the first symbol and the second symbol becoming separated from each other by more than the threshold distance in the star images.

11. A mount for an astronomical instrument, the mount comprising:
a right-ascension (RA) axis;
an electronic scope oriented substantially parallel to the RA axis; and
a set of non-transitory, computer-readable media having instructions which, when executed by a computing device, cause the computing device to perform a method of polar aligning the mount, the method comprising:
acquiring star images from the electronic scope;
determining a location of a celestial pole relative to the star images, based on computerized matching of the star images to information in a database;
displaying the star images superimposed with a first symbol and a second symbol, the first symbol indicating the determined location of the celestial pole relative to the star images, the second symbol indicating a location at which a right ascension (RA) axis of the mount intersects a field of view of the electronic scope, the mount becoming polar aligned responsive to the first symbol intersecting the second symbol.

12. The mount of claim 11, wherein the set of non-transitory, computer-readable media further store an RA coordinate that provides the location, relative to the star images, at which the RA axis of the mount intersects the field of view of the electronic scope.

13. The mount of claim 11, wherein the electronic scope includes firmware that stores camera driver software that enables the computing device to operate the electronic scope.

14. The mount of claim 11, wherein the electronic scope is disposed coaxially with the RA axis on a sky-facing portion of the mount.

15. The mount of claim 11, wherein the electronic scope is disposed coaxially with the RA axis on a ground-facing portion of the mount, and wherein the mount includes an aperture disposed on a sky-facing portion of the mount coaxially with the RA axis, the aperture allowing light to pass unobstructed through the mount to the electronic scope.

16. A computer program product including a set of non-transitory, computer-readable media having instructions which, when executed by a computing device, cause the computing device to perform a method of polar aligning a mount for an astronomical instrument, the method comprising:
acquiring star images from an electronic scope;
determining a location of a celestial pole relative to the star images, based on computerized matching of the star images to information in a database;
displaying the star images superimposed with a first symbol and a second symbol, the first symbol indicating the determined location of the celestial pole relative to the star images, the second symbol indicating a location at which a right ascension (RA) axis of the mount intersects a field of view of the electronic scope, the mount becoming polar aligned responsive to the first symbol intersecting the second symbol.

17. The computer program product of claim 16, wherein the method further comprises:
acquiring a set of dark images from the electronic scope with a lens of the electronic scope covered; and
correcting the star images using the set of dark images.

18. The computer program product of claim 16, wherein the computing device runs an application that stores an RA coordinate that provides the location at which the RA axis of the mount intersects the field of view of the electronic scope.

19. The computer program product of claim 18, wherein the method further comprises determining the RA coordinate by:
acquiring images from the electronic scope as the electronic scope is rotated relative to the mount; and
identifying the RA coordinate as a center of rotation of a set of objects displayed in the acquired images.

20. The computer program product of claim 16, wherein the star images show a foreground object, and wherein the method further comprises:
receiving user input that identifies an exclusion region that contains at least part of the foreground object,
wherein determining the location of the celestial pole relative to the star images ignores any content in the exclusion region identified by the user input.

* * * * *